(12) United States Patent
Chang et al.

(10) Patent No.: US 8,422,115 B2
(45) Date of Patent: Apr. 16, 2013

(54) DISPLAY DEVICE

(75) Inventors: Jae-Hyuk Chang, Seongnam-si (KR);
Seong-Sik Shin, Seongnam-si (KR);
Nam-Seok Roh, Seongnam-si (KR);
Kyung-Ho Lee, Jinju-si (KR); Jun-Bo Yoon, Daejeon-si (KR)

(73) Assignee: Samsung Display Co., Ltd., Yongin (KR)

( * ) Notice: Subject to any disclaimer, the term of this patent is extended or adjusted under 35 U.S.C. 154(b) by 1269 days.

(21) Appl. No.: 12/197,433

(22) Filed: Aug. 25, 2008

(65) Prior Publication Data
US 2009/0184907 A1    Jul. 23, 2009

(30) Foreign Application Priority Data

Jan. 18, 2008  (KR) .................. 10-2008-0005887

(51) Int. Cl.
G02B 26/00       (2006.01)

(52) U.S. Cl.
USPC ......... 359/291; 359/224.1; 345/206; 310/309

(58) Field of Classification Search ................ 359/227, 359/230, 290–292, 295, 199.4, 200.6, 224.1–224.2; 345/205–206, 211; 310/309
See application file for complete search history.

(56) References Cited

U.S. PATENT DOCUMENTS

| 5,226,099 | A  | 7/1993 | Mignardi |
| 6,738,029 | B2 | 5/2004 | Lang |
| 6,888,142 | B2 | 5/2005 | Pizzi |
| 6,946,725 | B2 | 9/2005 | Hacke |
| 2006/0007517 | A1 | 1/2006 | Tsai |
| 2006/0187396 | A1 | 8/2006 | Martin |

FOREIGN PATENT DOCUMENTS

| JP | 06230296 | 8/1994 |
| JP | 09304708 | 11/1997 |
| JP | 2002287045 | 10/2002 |
| JP | 2003098450 | 4/2003 |
| JP | 2003200394 | 7/2003 |
| JP | 2007192902 | 8/2007 |
| KR | 1020020028570 | 4/2002 |
| KR | 100366342 | 12/2002 |
| KR | 1020060134048 | 12/2006 |
| KR | 1020070030871 | 3/2007 |
| KR | 100708077 | 4/2007 |

*Primary Examiner* — James Phan

(74) *Attorney, Agent, or Firm* — H.C. Park & Associates, PLC

(57) ABSTRACT

A display device is provided. The display device includes: a substrate including a unit display area, a fixing member that is formed on the substrate and that is electrically isolated, an insulating layer that is formed on the fixing member, a fixing electrode that is formed on the insulating layer and that is electrically connected to a power source, and a plurality of moving members with one end fixed to the insulating layer and positioned apart by a distance from the fixing electrode. The plurality of moving members and the fixing electrode are positioned within the unit display area.

20 Claims, 7 Drawing Sheets

DISPLAY DEVICE

CROSS-REFERENCE TO RELATED APPLICATION

This application claims priority to and the benefit of Korean Patent Application No. 10-2008-0005887, filed on Jan. 18, 2008, which is hereby incorporated by reference for all purposes as if fully set forth herein.

BACKGROUND OF THE INVENTION

1. Field of the Invention

The present invention relates to a display device, more particularly, the present invention relates to a display device that displays an image using electrostatic induction and spatial division brightness adjustment.

2. Description of the Background

Flat displays that are widely used include a liquid crystal display, a plasma display panel, and an organic light emitting display.

The liquid crystal display displays an image using electrical and optical characteristics of liquid crystals, which have different light transmittance according to the intensity of an electric field. The plasma display panel displays an image using plasma generated by gas discharge. The organic light emitting display injects electrons and holes from a cathode and an anode, respectively, into an organic emission layer. The device emits light when an exciton, which is generated when an electron and a hole recombine, drops from an excited state to a ground state.

A display device that can be formed with a simpler structure while having similar performance as that of the above-described display devices is actively being developed. A display device that adjusts on/off states of a pixel by opening and closing a moving member through electrostatic force and elasticity has been researched.

Luminance of this display device may be adjusted by regulating an amount of light that passes through a display area. The amount of light that passes through is determined according to a time period in which a moving member is opened.

SUMMARY OF THE INVENTION

This invention provides a display device that may have a simple structure and may more accurately adjust an amount of light passing through a display area through temporal and spatial division.

Additional features of the invention will be set forth in the description which follows, and in part will be apparent from the description, or may be learned by practice of the invention.

The present invention discloses a display device including a substrate including an unit display area, a fixing member that is disposed on the substrate and that is electrically isolated, an insulating layer that is disposed on the fixing member; a fixing electrode that is disposed on the insulating layer and that is electrically connected to a power source, and a plurality of moving members having one end fixed to the insulating layer and spaced apart by from the fixing electrode. The plurality of moving members and the fixing electrode are positioned within the unit display area.

The plurality of moving members may be deformed by electrostatic attraction between the fixing member and the moving members, and the other end of each of the plurality of moving members may be deformed from a curved state that is apart from the insulating layer to a flat state that contacts the insulating layer.

A first moving member of the plurality of moving members may be electrically connected to a power source.

When the other end of the first moving member is away from the insulating layer, a second moving member adjacent to the first moving member may be electrically isolated.

When a first voltage having opposite polarities is applied to the fixing electrode and the first moving member, the first moving member may be deformed to a flat state by electrostatic attraction between the fixing member and the first moving member.

When the first moving member is in substantially a flat state, the first moving member may contact the second moving member.

When a second voltage is applied to the second moving member that is contacted with the first moving member, the second moving member may be deformed to a flat state by electrostatic attraction between the fixing member and the second moving member.

A magnitude of the second voltage may be greater than that of the first voltage.

When the plurality of moving members are not in a flat state, a cross-section of the plurality of moving members may have a quadrant circle shape or a quadrant oval shape.

The plurality of moving members may overlap with the fixing member.

Areas of portions in which each of the plurality of moving members and the fixing member overlap may be different.

An area of a portion in which the fixing member overlaps with the first moving member may be greater than that of a portion in which the fixing member overlaps with the second moving member.

An entire surface of the fixing electrode may overlap with the fixing member.

Magnitudes of voltages that are distributed to the first moving member and the second moving member may be different, and a voltage that is distributed to the second moving member may be greater than a voltage that is distributed to the first moving member.

The insulating layer may include a color filter.

The plurality of moving members may be made of a metal or a compound having elasticity.

The moving member may include a material that is selected from a group consisting of aluminum, gold, nickel, titanium, an aluminum alloy, and titanium nitride.

The moving member and the fixing electrode may include a light blocking material.

The fixing member may be made of a transparent conductor.

The display device may be of a transmission type.

According to an exemplary embodiment of the present invention, an opening degree of a unit display area can be spatially controlled using a plurality of moving members, whereby brightness of the display device can be accurately adjusted.

Further, according to an exemplary embodiment of the present invention, because a signal line for applying a voltage to the fixing member and some of the moving members is not necessary, the display device can have a simple structure. Furthermore, because an occupying space of a signal line that is connected to the moving member and the fixing member can be removed, an aperture ratio can be improved.

Further, according to an exemplary embodiment of the present invention, because voltages that are distributed to a plurality of moving members can be differently designed, stable operation of the moving member can be secured.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
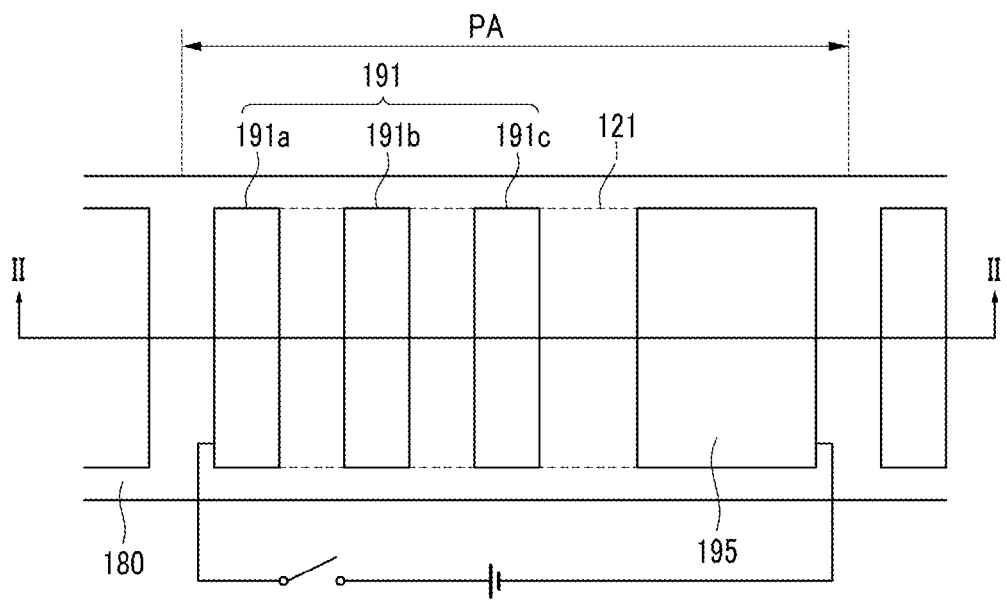
FIG. 1 is a top plan view of a display device according to an exemplary embodiment of the present invention.

The present invention will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" or "connected to" another element, it can be directly on or directly connected to the other element or intervening elements may also be present. In contrast, when an element is referred to as being "directly on" or "directly connected to" another element, there are no intervening elements present.

First, a display device according to an exemplary embodiment of the present invention is described with reference to FIG. 1, FIG. 2, and FIG. 3.

Figure 2:
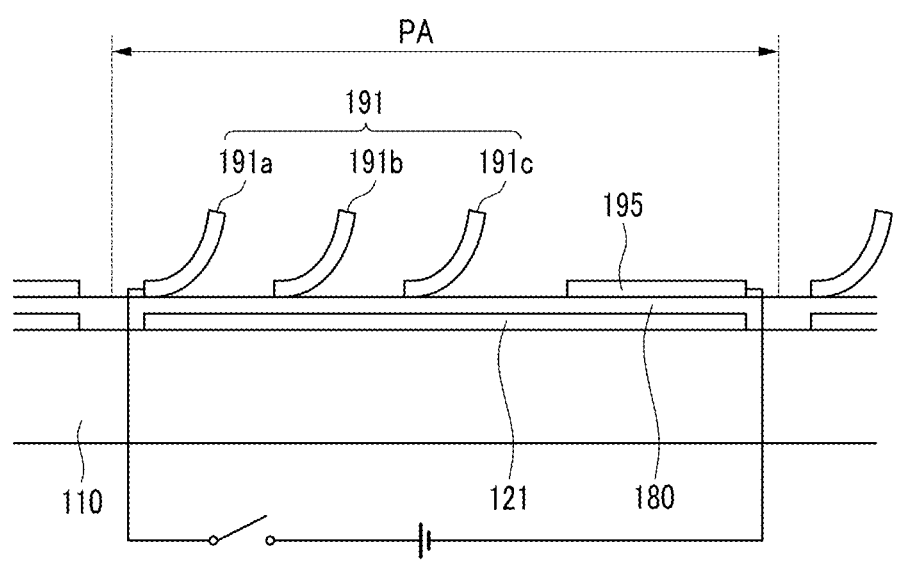
FIG. 2 is a cross-sectional view taken along line II-II of FIG. 1.
Figure 3:
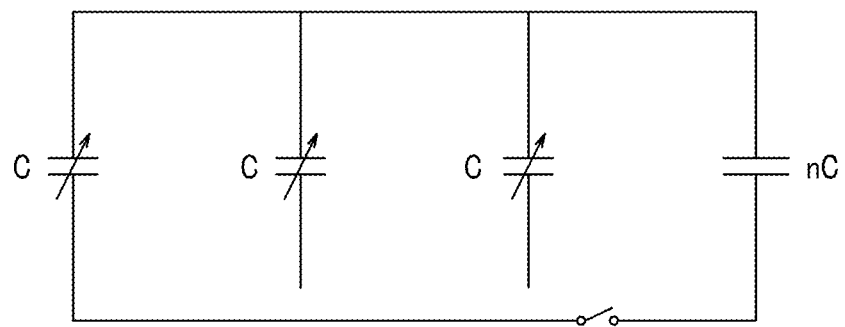
FIG. 3 is an equivalent circuit diagram of the display device of FIG. 2.

FIG. 1 is a top plan view of a display device according to an exemplary embodiment of the present invention, FIG. 2 is a cross-sectional view taken along line II-II of FIG. 1, and FIG. 3 is an equivalent circuit diagram of the display device of FIG. 2.

Referring to FIG. 1 and FIG. 2, the display device includes a plurality of fixing members 121, a plurality of fixing electrodes 195, and a plurality of moving member groups 191.

The plurality of fixing members 121 is formed on a substrate 110, and each fixing member 121 is positioned in a unit display area PA. Alternatively, the plurality of fixing members 121 may be integrally formed. Each fixing member 121 is electrically isolated and may be made of a conductive material or a dielectric material. Further, the fixing member 121 may be made of a transparent conductive material such as indium tin oxide (ITO) or indium zinc oxide (IZO). The fixing member 121 may be made of doped silicon, a conductive polymer, or a metal, and it may also be opaque.

An insulating layer 180, which may be made of an inorganic material or organic material, is formed on the fixing members 121. The insulating layer 180 has a single-layered structure. Alternatively, the insulating layer 180 may have a dual-layered structure of an inorganic layer and an organic layer.

The insulating layer 180 may be a color filter that is made of an organic material including a pigment. In this case, the color filter can display one of three primary colors, such as red, green, and blue. Alternatively, the color filter may be separately provided on the insulating layer 180.

The moving members 191 and the fixing electrodes 195 are formed on the insulating layer 180. One fixing electrode 195 and one moving member group 191 are positioned in the unit display area PA. One moving member group 191 includes at least one moving member. As shown in FIG. 2, in this embodiment, one moving member group 191 includes three moving members 191a, 191b, and 191c. The fixing electrode 195 and the moving member group 191 overlap with the fixing member 121 in the unit display area PA. The number of moving members included in one moving member group 191 may change according to a design of the display device.

The fixing electrode 195 and one of the plurality of moving members 191a, 191b, and 191c are connected to a power source (not shown) to receive a voltage of a predetermined magnitude from the power source, and the remaining moving members 191a, 191b, and 191c are not connected to the power source. Voltages that are applied to one moving member 191a, 191b, and 191c and the fixing electrode 195 have opposite polarities.

The respective moving members 191a, 191b, and 191c have an approximately rectangular shape and may be in a curved state, as shown in FIG. 2, or they may be in a completely unfolded state (i.e., lying flat on the insulating layer 180). One end of the moving members 191a, 191b, and 191c is fixed to the insulating layer 180, and the other end of the moving members 191a, 191b, and 191c are not fixed to the insulating layer 180.

When electrostatic attraction from the outside does not exist, the moving members 191a, 191b, and 191c may be in a curved state, and particularly, a cross-section of the moving members 191a, 191b, and 191c may have approximately a quadrant shape or a quadrant oval shape. However, when voltages of predetermined magnitudes having opposite polarities are applied to the fixing electrode 195 and the moving members 191a, 191b, and 191c, respectively, electrostatic induction is generated between the fixing electrode 195 and the fixing member 121 and between the respective moving members 191a, 191b, and 191c and the fixing member 121, thereby generating an attraction between the moving members 191a, 191b, and 191c and the fixing member 121. Accordingly, the portions of the moving members 191a, 191b, and 191c that are away from the insulating layer 180 approach the insulating layer 180. When attraction is fully generated, the entire surface of each moving member 191a, 191b, and 191c contacts the insulating layer 180, thereby covering the unit display area PA. When the voltage that is applied to the fixing electrode 195 and the moving members 191a, 191b, and 191c is removed, the moving members 191a, 191b, and 191c return to their original position by elasticity.

The fixing electrodes 195 may be made of an opaque metal. The moving members 191a, 191b, and 191c may be made of a metal that is opaque and has elasticity. For example, the moving members 191a, 191b, and 191c may be made of aluminum, gold, nickel, titanium, or an aluminum alloy. Further, the moving members 191a, 191b, and 191c may be made of titanium nitride. An insulating coating that is made of silicon dioxide ($SiO_2$) or aluminum oxide ($Al_2O_3$) may be formed on a surface of the respective moving members 191a, 191b, and 191c. In a transmission type of display device in which light that is incident from the lower side transmits to the upper side, a reflection prevention layer may be further formed, and in a reflective type of display device in which light that is incident from the upper side is reflected, a reflection improvement layer may be further formed. In the transmission type of display device, the fixing members 121 should be transparent.

In order to apply voltages to the moving members 191a, 191b, and 191c and the fixing electrode 195, the display device according to the present exemplary embodiment can use a passive matrix driving method that uses a horizontal electrode (not shown) and a vertical electrode (not shown) that are formed to cross on the substrate 110.

Further, the display device according to the present exemplary embodiment may us an active matrix driving method that uses at least one switching element (not shown) for individually switching an applied voltage. For example, the switching element may be a thin film transistor (not shown). In this case, gate lines (not shown), which transfer scanning signals for turning on/off the thin film transistors, and data lines (not shown), which transfer voltages that are applied to the fixing electrodes 195 or the moving members 191a, 191b, and 191c, can be formed to cross on the substrate 1 10. One thin film transistor may include a gate electrode, a source electrode, a drain electrode, and a semiconductor. When the thin film transistor is connected to only the moving members 191a, 191b, and 191c, a common voltage can be applied to the fixing electrode 195. However, a function of the moving members 191a, 191b, and 191c and the fixing electrode 195 may be changed. Alternatively, two thin film transistors may be disposed in one unit display area PA to be connected to the moving members 191a, 191b, and 191c and the fixing electrode 195.

A light source unit (not shown) can be disposed at a lower part of the substrate 110. The light source unit includes a light source, a light guide plate, and a reflection member. The light guide plate transmits light that is radiated from the light source, and the reflection member guides the light that is transmitted from the light guide plate toward the unit display area PA to reduce optical loss. In the reflective type display device, the light source unit may be omitted.

A light blocking member can be disposed at an upper part of the substrate 110 to prevent light leakage. The light blocking member can be formed on another substrate, and it can be formed together with color filters.

Referring to FIG. 3, in the display device according to the present exemplary embodiment, each pixel may be represented with four capacitors and a switch. In FIG. 3, three of the capacitors each include a moving member 191a, 191b, and 191c and the fixing member 121 and capacitance thereof is represented by C, and the remaining capacitor includes the fixing electrode 195 and the fixing member 121 and capacitance thereof is represented by nC.

A method of driving a display device having a structure of FIG. 1 and FIG. 2 is described below with reference to FIG. 4, FIG. 5, FIG. 6, FIG. 7, FIG. 8, FIG. 9, and FIG. 10.

Figure 4:
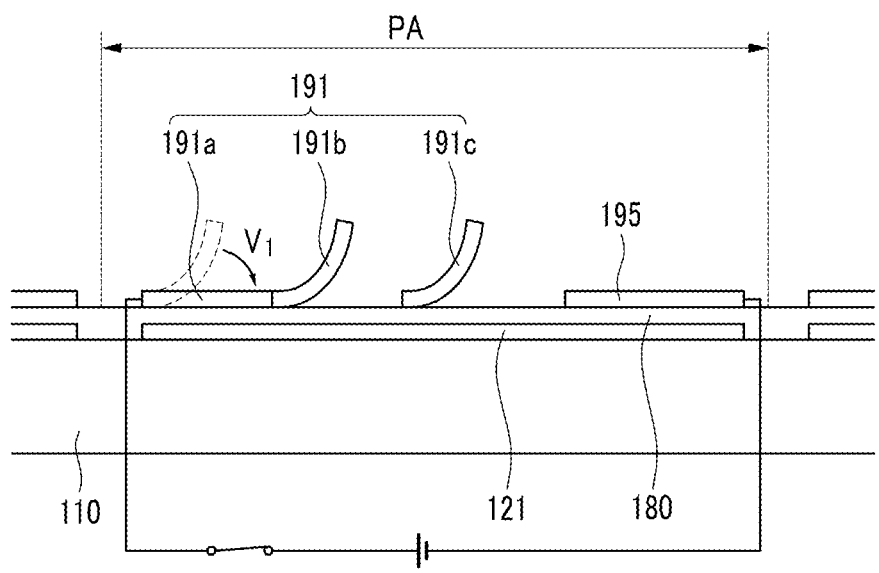
FIG. 4, FIG. 6, and FIG. 8 show a spatial division brightness expression method of a display device according to an exemplary embodiment of the present invention.
Figure 5:
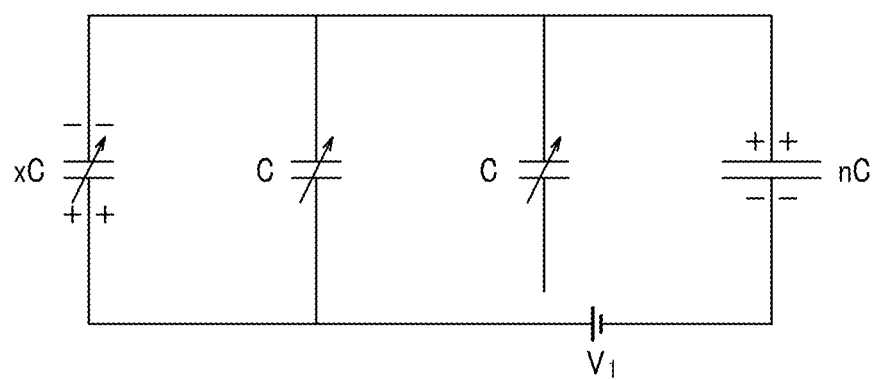
FIG. 5, FIG. 7, and FIG. 9 are circuit diagrams illustrating capacitance according to an operating state of a moving member according to an exemplary embodiment of the present invention.
Figure 6:
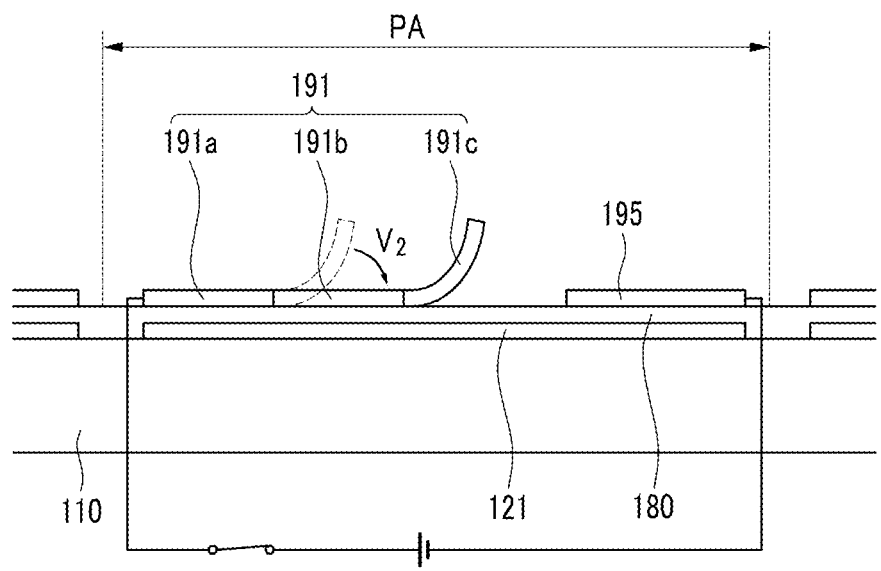
Figure 7:
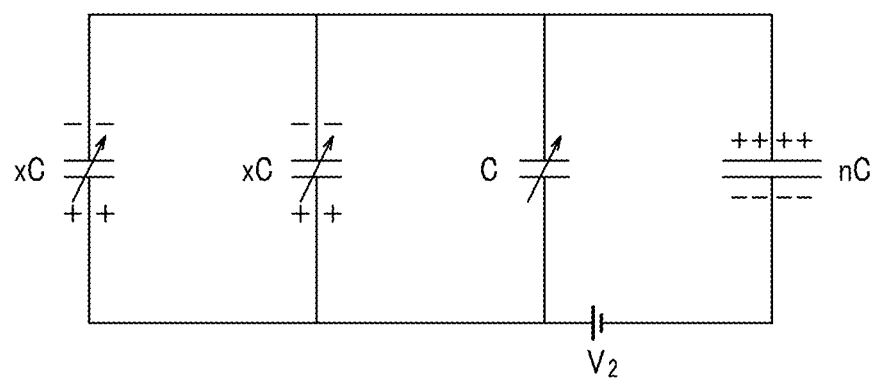
Figure 8:
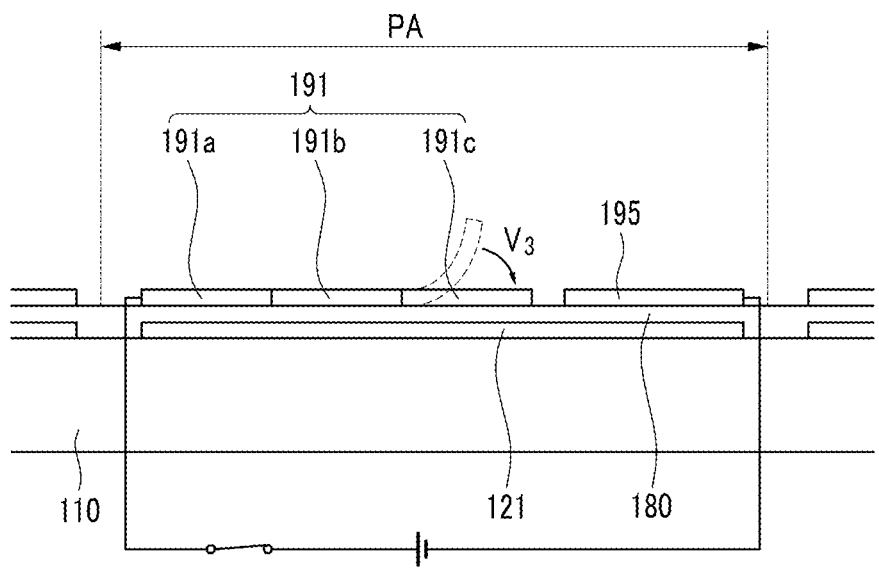
Figure 9:
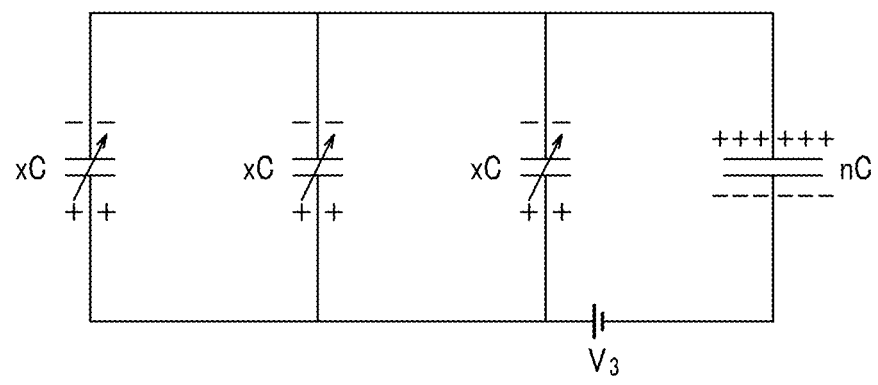
Figure 10:
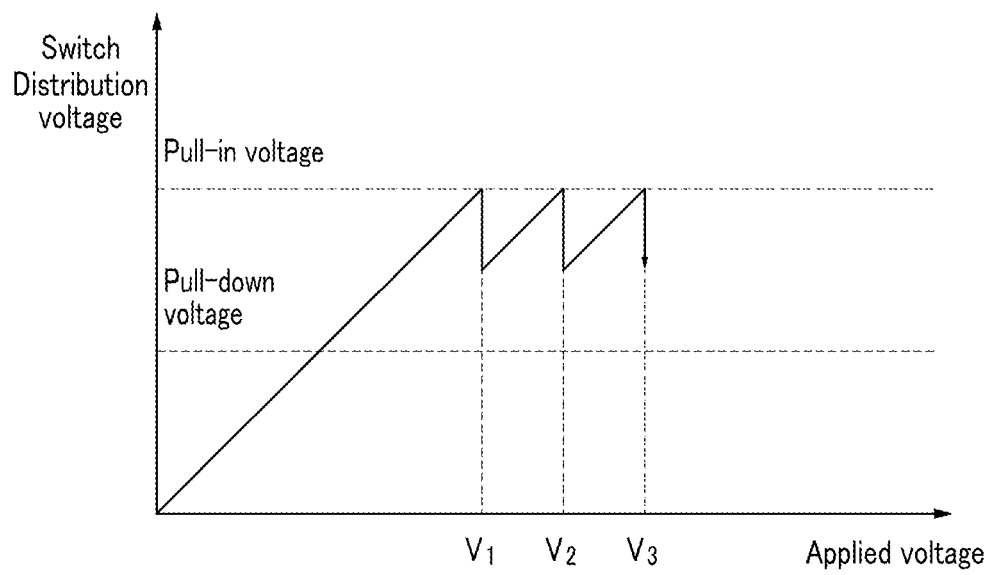
FIG. 10 is a graph illustrating a state of a voltage that is distributed to a moving member according to an exemplary embodiment of the present invention.

FIG. 4, FIG. 6, and FIG. 8 show a spatial division brightness expression method of the display device and are cross-sectional views sequentially illustrating an operation of a moving member according to an applied voltage, FIG. 5, FIG. 7, and FIG. 9 are circuit diagrams illustrating capacitance according to an operating state of a moving member, and FIG. 10 is a graph illustrating a state of a voltage that is distributed to a moving member.

Referring to FIG. 4, a first moving member 191a is deformed to a flat state to contact the insulating layer 180, and second and third moving members 191b and 191c maintain a curved state. In this case, because the first moving member 191a covers a first portion of the unit display area PA, light is blocked by the first moving member 191a, and because the second and third moving members 191b and 191c do not cover the second and third portions of the unit display area PA, light passes through those portions. Hence, a smaller amount of light passes as compared with that as shown in FIG. 2 when the first to third moving members 191a, 191b, and 191c do not cover the first to third portions of the unit display area PA.

Referring to FIG. 6, because the first and second moving members 191a and 191b cover the first and second portions of the unit display area PA, light is blocked by the first and second moving members 191a and 191b, and because the third moving member 191c does not cover the third portion of the unit display area PA, light passes through that portion. A smaller amount of light passes as compared with the case of FIG. 4.

Referring to FIG. 8, because the first to third moving members 191a, 191b, and 191c cover the first to third portions of the unit display area PA, i.e., the entire unit display area PA, light does not pass through the unit display area PA. In this case, the unit display area PA is in a black state.

In this way, in the present exemplary embodiment, an opening degree of the unit display area PA can be spatially controlled using the plurality of moving members 191a, 191b, and 191c, thereby accurately adjusting brightness of the display device.

As shown in FIG. 4, FIG. 5, and FIG. 10, voltages of opposite polarities are applied to the fixing electrode 195 and the first moving member 191a. A negative (−) voltage is applied to the fixing electrode 195, and a positive (+) voltage is applied to the first moving member 191a. Accordingly, a positive (+) charge is induced to a portion of the fixing member 121 adjacent to the fixing electrode 195, and a negative (−) charge is induced to a portion of the fixing member 121 adjacent to the first moving member 191a. If capacitance nC of the fixing electrode 195 and the fixing member 121 is greater than capacitance C of the first moving member 191a and the fixing member 121, most of the voltage can be distributed to the first moving member 191a and the fixing member 121. Because the fixing electrode 195 is positioned closer to the fixing member 121 than the first moving member 191a with one side that is away from the insulating layer 180, and an area in which the fixing electrode 195 overlaps with the fixing member 121 is greater than that in which the first moving member 191a overlaps with the fixing member 121, capacitance nC is large. Therefore, due to electrostatic induction, electrostatic attraction is generated between the first moving member 191a and the fixing member 121, thereby causing the first moving member 191a to move toward the insulating layer 180. As a predetermined magnitude of voltage V1 is applied to the first moving member 191a and the fixing electrode 195, when a voltage that is distributed to the first moving member 191a and the fixing member 121 reaches a pull-in voltage, the first moving member 191a is connected to the second moving member 191b while completely contacting the insulating layer 180. At the same time, capacitance xC of the first moving member 191a and the fixing member 121 increases, and a voltage that is distributed to the first moving member 191a and the fixing member 121 decreases. Finally, the first moving member 191a may sustain a flat state, and the second moving member 191b and the fixing member 121 may sustain a state having low capacitance C.

Next, as shown in FIG. 6, FIG. 7, and FIG. 10, when the voltage V1 that is applied to the first and second moving members 191a and 191b and the fixing electrode 195 is further increased, the electrostatic attraction between the second moving member 191b and the fixing member 121 increases. Thus, the second moving member 191b moves toward the insulating layer 180. When the voltage that is applied to the first and second moving members 191a and 191b and the fixing electrode 195 reaches a predetermined magnitude of voltage V2, the voltage that is distributed to the first and second moving members 191a and 191b and the fixing member 121 again reaches the pull-in voltage. Accordingly, the second moving member 191b completely contacts the insulating layer 180 and is also connected to the third moving member 191c. At the same time, capacitance xC of the second moving member 191b and the fixing member 121 increases, and a voltage that is distributed to the second moving member 191b and the fixing member 121 decreases. Finally, the second moving member 191b may sustain a flat state, and the third moving member 191c and the fixing member 121 may sustain a state having low capacitance C.

Next, as shown in FIG. 8, FIG. 9, and FIG. 10, when the voltage V2 that is applied to the first to third moving members 191a, 191b, and 191c and the fixing electrode 195 is further increased, as the electrostatic attraction between the third moving member 191c and the fixing member 121 increases, the third moving member 191c moves toward the insulating layer 180. When the voltage that is applied to the first to third moving members 191a, 191b, and 191c and the fixing electrode 195 reaches a predetermined magnitude of voltage V3, the voltage that is distributed to the first to third moving members 191a, 191b, and 191c and the fixing member 121 again reaches the pull-in voltage. Accordingly, the third moving member 191c completely contacts the insulating layer 180 while being spaced apart from the fixing electrode 195. At the same time, capacitance xC of the third moving member 191c and the fixing member 121 increases, and a voltage that is distributed to the third moving member 191c and the fixing member 121 decreases. Finally, the third moving member 191c may sustain a flat state.

Therefore, by adjusting the number of moving members 191a, 191b, and 191c that are driven according to the applied voltage, several moving members 191a, 191b, and 191c that constitute one pixel may be sequentially driven using one set of wiring.

Alternatively, when a voltage that is applied to the first to third moving members 191a, 191b, and 191c and the fixing electrode 195 decreases, the first to third moving members 191a, 191b, and 191c may sequentially return to their original states by elasticity.

A display device according to another exemplary embodiment of the present invention is described below with reference to FIG. 11, FIG. 12, and FIG. 13.

Figure 11:
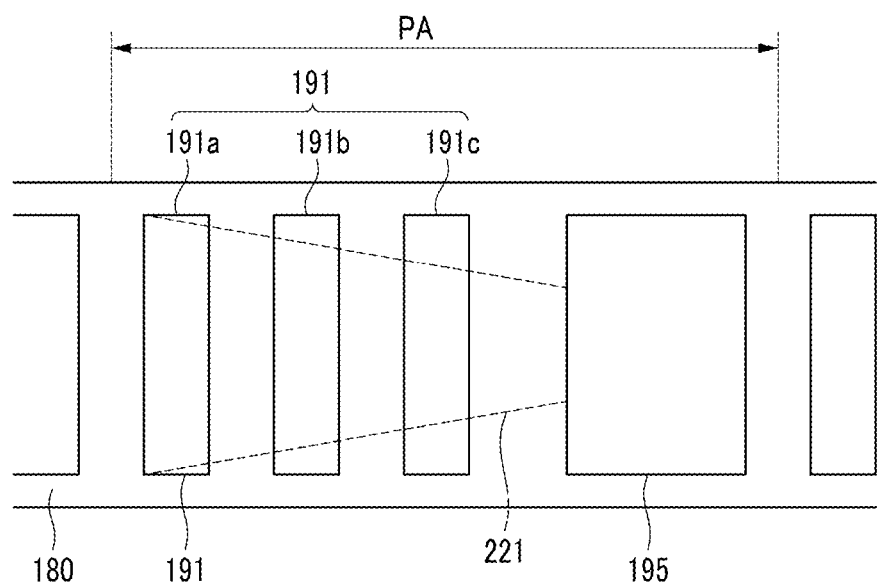
FIG. 11 is a top plan view of a display device according to another exemplary embodiment of the present invention.
Figure 12:
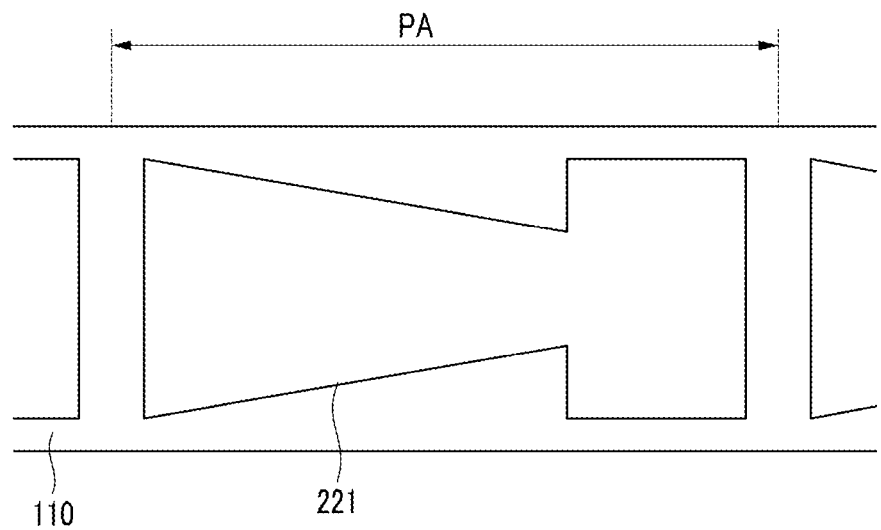
FIG. 12 is a top plan view illustrating a fixing member of FIG. 11.
Figure 13:
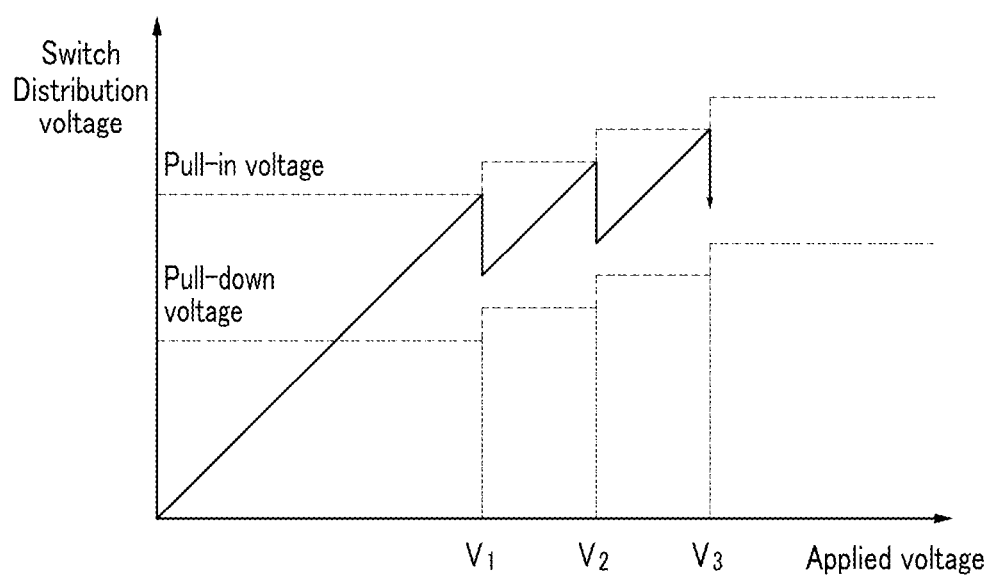
FIG. 13 is a graph illustrating a state of a voltage that is distributed to a moving member of FIG. 11.

FIG. 11 is a top plan view of a display device according to another exemplary embodiment of the present invention, FIG. 12 is a top plan view illustrating a fixing member of FIG. 11, and FIG. 13 is a graph illustrating a voltage state that is distributed to a moving member of FIG. 11.

Referring to FIG. 11, FIG. 12, and FIG. 13, the display device includes a substrate 20 110 including a plurality of unit display areas PA, fixing members 221 that are formed on the substrate 110, an insulating layer 180 that is formed on the fixing members 221, a plurality of fixing electrodes 195 that are formed on the insulating layer 180, and a plurality of moving member groups 191.

In this embodiment, one moving member group 191 includes three moving members 191a, 191b, and 191c.

As described above, one unit display area PA includes three moving members 191a, 191b, and 191c, one fixing electrode 195, and one fixing member 221.

The substrate 110, the insulating layer 180, and the fixing electrodes 195 according to the present exemplary embodiment are substantially identical to those of the exemplary embodiment shown in FIG. 1 and FIG. 2.

However, in the present exemplary embodiment, areas of regions in which each moving member 191a, 191b, and 191c and the fixing member 221 overlap are different in one unit display area PA.

First, the fixing member 221 includes a trapezoidal portion and a rectangular portion. The trapezoidal portion overlaps with the moving members 191a, 191b, and 191c, and the rectangular portion overlaps with the fixing electrode 195. Further, while advancing to the right side from the moving member 191a that is positioned at the extreme left, the moving members 191a, 191b, and 191c are positioned to decrease an area that they overlap with the fixing member 221.

Accordingly, capacitance of capacitors made of the moving members 191a, 191b, and 191c and the fixing member 221 changes, and thus a distribution voltage between the capacitors changes. Specifically, capacitance of the fixing member 221 and the moving member 191a that is positioned at the extreme left is greater than that of the fixing member 221 and the moving member 191c that is positioned at the extreme right. Therefore, as shown in FIG. 13, a voltage that is applied to the capacitor including the moving member 191a is smallest, and a voltage that is applied to the capacitor including the moving member 191c is greatest.

In such a structure, as the voltage is gradually reduced, the moving members 191a, 191b, and 191c are sequentially opened from the moving member 191c that is positioned at the extreme right to which the highest voltage should be applied. When this order is changed, for example when the moving member 191a or 191b that is positioned at the extreme left or at the middle is first opened, because the remaining moving members 191a, 191b, and 191c are isolated in a state having a voltage, the remaining moving members 191a, 191b, and 191c continuously sustain the voltage and thus the display device may not be properly operated.

Many characteristics in the exemplary embodiment that are shown in FIG. 1 and FIG. 2 may be applied to the present exemplary embodiment.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
a substrate comprising a unit display area;
a fixing member disposed on the substrate, the fixing member being electrically isolated;
an insulating layer disposed on the fixing member;
a fixing electrode disposed on the insulating layer and electrically connected to a power source; and
a plurality of moving members spaced apart from the fixing electrode, each moving member having a portion fixed to the insulating layer,
wherein the moving members and the fixing electrode are positioned within the unit display area.

2. The display device of claim 1, wherein the moving members are deformed by electrostatic attraction between the fixing member and the moving members, and an un-fixed portion of each moving member that is apart from the insulating layer is deformed to a flat state to contact the insulating layer.

3. The display device of claim 2, wherein a first moving member of the plurality of moving members is electrically connected to the power source.

4. The display device of claim 3, wherein a second moving member adjacent to the first moving member is electrically isolated when the first moving member is not in the flat state.

5. The display device of claim 4, wherein the first moving member is deformed to the flat state by electrostatic attraction between the fixing member and the first moving member when a first voltage having opposite polarities is applied to the fixing electrode and the first moving member.

6. The display device of claim 5, wherein the first moving member contacts the second moving member when the first moving member is in the flat state.

7. The display device of claim 6, wherein the second moving member is deformed to the flat state by electrostatic attraction between the fixing member and the second moving member when a second voltage is applied to the second moving member that is contacted with the first moving member.

8. The display device of claim 7, wherein a magnitude of the second voltage is greater than a magnitude of the first voltage.

9. The display device of claim 2, wherein a cross-section of the moving members has a quadrant circle shape or a quadrant oval shape when the moving members are not in the flat state.

10. The display device of claim 6, wherein the moving members overlap with the fixing member.

11. The display device of claim 10, wherein overlapping areas of each moving member and the fixing member are different.

12. The display device of claim 11, wherein an overlapping area of the fixing member and the first moving member is greater than an overlapping area of the fixing member and the second moving member.

13. The display device of claim 10, wherein an entire surface of the fixing electrode overlaps with the fixing member.

14. The display device of claim 12, wherein magnitudes of voltages that are distributed to the first moving member and the second moving member are different from each other, and
a voltage that is distributed to the second moving member is greater than a voltage that is distributed to the first moving member.

15. The display device of claim 1, wherein the insulating layer comprises a color filter.

16. The display device of claim 1, wherein the moving members comprise a metal or a compound having elasticity.

17. The display device of claim 16, wherein each moving member comprises a material that is selected from the group consisting of aluminum, gold, nickel, titanium, an aluminum alloy, and titanium nitride.

18. The display device of claim 16, wherein the moving member and the fixing electrode each comprise a light blocking material.

19. The display device of claim 18, wherein the fixing member comprises a transparent conductor.

20. The display device of claim 19, wherein the display device is a transmission type.

* * * * *

UNITED STATES PATENT AND TRADEMARK OFFICE
CERTIFICATE OF CORRECTION

PATENT NO. : 8,422,115 B2  
APPLICATION NO. : 12/197433  
DATED : April 16, 2013  
INVENTOR(S) : Jae-Hyuk Chang et al.

Page 1 of 1

It is certified that error appears in the above-identified patent and that said Letters Patent is hereby corrected as shown below:

Title Page at item (73), please add second Assignee:

Korea Advanced Institute of Science and Technology, Daejeon-si (KR)

Signed and Sealed this  
Tenth Day of December, 2013

Margaret A. Focarino  
*Commissioner for Patents of the United States Patent and Trademark Office*